United States Patent
Payen et al.

(10) Patent No.: US 7,258,117 B2
(45) Date of Patent: Aug. 21, 2007

(54) HEAT-PRODUCING AGGLOMERATES AND THEIR APPLICATION IN FLAMELESS HEATERS AND SELF-HEATING PACKAGING

(75) Inventors: Vincent Payen, Hoboken, NJ (US); Robert Finn, Westfield, NJ (US); Joseph Mitchell, Somerset, NJ (US); George Carl Harmsen, Toms River, NJ (US); Dennis L. Myers, Newtown, PA (US); Joseph Kirkpatrick, Jackson, NJ (US)

(73) Assignee: Innophos, ,Inc., Cranbury, NJ (US)

( * ) Notice: Subject to any disclaimer, the term of this patent is extended or adjusted under 35 U.S.C. 154(b) by 194 days.

(21) Appl. No.: 10/967,488

(22) Filed: Oct. 18, 2004

(65) Prior Publication Data

US 2005/0092319 A1 May 5, 2005

Related U.S. Application Data

(60) Provisional application No. 60/512,460, filed on Oct. 17, 2003.

(51) Int. Cl.
*F24J 1/00* (2006.01)

(52) U.S. Cl. .................................... 126/263.08

(58) Field of Classification Search ..............
126/263.01–263.09, 204, 206
See application file for complete search history.

(56) References Cited

U.S. PATENT DOCUMENTS

| 3,429,672 | A |   | 2/1969 | Young |
| 4,670,307 | A | * | 6/1987 | Onishi et al. ............... 427/261 |
| 4,793,323 | A |   | 12/1988 | Guida et al. |
| 5,611,329 | A |   | 3/1997 | Lamensdorf |
| 5,798,066 | A | * | 8/1998 | Uram .......................... 264/85 |
| 5,935,486 | A |   | 8/1999 | Bell et al. |
| 5,984,995 | A |   | 11/1999 | White |
| 6,248,257 | B1 |  | 6/2001 | Bell et al. |

OTHER PUBLICATIONS

PCT International Search Report dated Feb. 28, 2005.

* cited by examiner

*Primary Examiner*—Ken Rinehart
*Assistant Examiner*—Sarah E. Suereth
(74) *Attorney, Agent, or Firm*—McCarter & English, LLP

(57) ABSTRACT

A heat-producing agglomerate contains particles of an acidic component selected from acid anhydrides, acid salts, and mixtures thereof, or a basic component selected from bases, basic anhydrides, basic salts, and mixtures thereof, or a mixture of such acidic and basic components. The heat producing agglomerate provides high heat output at a controllable rate of heat generation, minimizes safety and environmental risks, and is useful as a heat-producing component in self-heating packaging.

22 Claims, 1 Drawing Sheet

HEAT-PRODUCING AGGLOMERATES AND THEIR APPLICATION IN FLAMELESS HEATERS AND SELF-HEATING PACKAGING

CROSS-REFERENCE TO RELATED APPLICATION

The present application claims priority to U.S. Provisional Application Serial No. 60/512,460 filed on Oct. 17, 2003, the contents of which are incorporated herein by reference in their entirety.

FIELD OF THE INVENTION

This invention relates to a heat-producing agglomerate, more particularly to a heat-producing agglomerate that produces heat when exposed to water and that is useful as a heat source for flameless heaters and self-heating packaging. The heat-producing agglomerate may be used in portable devices for heating food, liquids, or for other applications where portable heat-producing materials may be useful.

BACKGROUND OF THE INVENTION

Heat-producing compositions for use in self-heating packaging are known. Previous heat-producing compositions typically produce heat by combining two or more reagents in a manner which produces a reaction which creates heat. For example, a solid material may be combined with a liquid, such as water, to produce heat as a result of the hydration of the solid material. Alternatively, the liquid may be a solution containing a material that will react with the solid to produce an exothermic chemical reaction, thereby releasing heat. However, the prior heat-producing compositions exhibit certain undesirable characteristics.

U.S. Pat. No. 4,793,323 describes a self-heating container in which a multi-compartment package contains a food or liquid to be heated. The container includes two compartments that are separated by a membrane. Each of the compartments contains a reagent, and a member is provided for breaking the membrane. Upon breaking the membrane, the reagents (for example water and calcium chloride or calcium oxide) are allowed to mix and the resulting exothermic reaction heats the package and its contents. Among the disadvantages of the system is that the respective heat outputs of the disclosed reagent systems are such that a relatively large amount of such reagents is required to heat a relatively small amount of food or beverage.

U.S. Pat. No. 5,611,329 describes a flameless heater that consists of non-woven, water permeable polyester sheets that are thermally bonded together to form a number of pockets. Each of the pockets formed by the bonded polyester sheets is filled with a powder mixture of a Mg—Fe alloy, NaCl, antifoaming agents and an inert filler. Upon exposure to water, the Mg—Fe alloy under goes an exothermic reaction, that is, hydration of the magnesium component of the alloy. The heat generated by the hydration reaction can be used to, for example, heat military field rations. One disadvantage of the flameless heater is that the hydration of magnesium generates hydrogen gas, which may pose a safety hazard.

U.S. Pat. Nos. 5,935,486 and 6,248,257 describe portable heat sources that include a heat-producing composition comprising a mixture of an acidic anhydride or salt, a basic anhydride or salt and inert materials. Addition of water to the mixture results in exothermic reactions that generate heat. While the heating compositions provide some improved performance over prior systems, the disclosed systems provide only rough control over the rate of heat generation, and can result in compositions in which uncontrolled reactions occur, leading to rapid and potentially dangerous rates of heat generation. In addition the heat-producing compositions may, in some embodiments, generate caustic wastes that may complicate disposal of used heat sources.

It would be useful to overcome these and other shortcomings of the prior art in order to provide a heat-producing composition that provides a high heat output, in a controllable manner, without generating serious safety or environmental risks.

SUMMARY OF THE INVENTION

The present invention is directed to heat-producing agglomerates which can be used in various configurations to provide a portable heat source that may be used in, for example, portable containers for heating food or liquids, or in any other application where it would be beneficial to have a portable heat source. The heat producing agglomerates of the present invention generally comprise at least one component that releases and/or generates heat when exposed to water. In preferred embodiments, the heat-producing agglomerates comprise two components which both release heat when exposed to water as a result of hydration, and further release heat as a result of a chemical reaction that may occur between the two components, such as a neutralization reaction between an acidic component and a basic component. The acidic component and the basic component may be selected to create a nearly neutral, environmentally safe by-product to allow safe and easy disposal of the used agglomerate system.

Accordingly, in one aspect, the present invention is directed to a heat-producing agglomerate comprising particles of an acidic component selected from acid anhydrides, acid salts, and mixtures thereof, or a basic component selected from bases, basic anhydrides, basic salts, and mixtures thereof, or a mixture of such acidic and basic components. The particles may be combined with a binder material to allow or facilitate agglomeration into larger particles. Alternatively, the particles may be agglomerated or otherwise processed to achieve a desired particle size distribution in the absence of a binder material. In one embodiment, the materials are agglomerated into larger particles or tablets having an axial crush strength of greater than or equal to 0.5 kilopond. In further exemplary embodiments of the present disclosure, larger particles or tablets are formed that exhibit an axial crush strength of 2 about kilopond to about 35 kilobond.

In a preferred embodiment, the heat-producing agglomerate is comprised of phosphorus pentoxide, calcium oxide and a binder material such as carnauba wax. When the heat-producing agglomerate is combined with water, hydration of the phosphorus pentoxide and the calcium oxide release heat. Additional heat is released as a result of the exothermic neutralization reaction between the phosphoric acid and calcium hydroxide formed as a result of the hydration of the phosphorus pentoxide and the calcium oxide. As described in detail below, it is preferable to control the particle size of the component(s) incorporated into the disclosed heat-producing system, e.g., the calcium oxide or the phosphorus pentoxide, or both, to avoid the possibility of an undesirable uncontrolled reaction between the components.

In another aspect, the present invention is directed to a method for making a heat-producing agglomerate, comprising agglomerating particles of an acidic component selected from acid anhydrides, acid salts, and mixtures thereof, or a basic component selected from bases, basic anhydrides, basic salts, and mixtures thereof, or a mixture of such acidic and basic components. The components may be combined with a binder material to allow agglomeration of the heat-producing materials. According to the present disclosure, it is contemplated that individual components (e.g., acidic and basic components) may be mixed before, during or after agglomeration is commenced to form a desired heat-producing agglomerate.

In another aspect, the present invention is directed to a flameless heater, comprising one or more heat-producing agglomerates according to the present invention and a container or defined/bounded region for the agglomerates.

In another aspect, the present invention is directed to a self-heating packaging system, comprising:
(a) a material vessel for containing a material to be heated, and
(b) a flameless heater comprising one or more heat-producing agglomerates of the present invention.

In another aspect, the present invention is directed to a particulate heat-producing composition that may be directly compressed or otherwise combined to form heat-producing agglomerates, said composition comprising a mixture of:
(a) particles of an acidic component selected from acid anhydrides, acid salts, and mixtures thereof, or a basic component selected from bases, basic anhydrides, basic salts, and mixtures thereof, or a mixture thereof, and
(b) a lubricant.

Accordingly, the present invention overcomes one or more of the drawbacks or disadvantages of the prior art and provides a heat-producing agglomerate which may be used to provide a portable heat source for use in heating food, water or for any other appropriate use. The heat-producing agglomerates can be used to provide a safe heat source which produces reaction products that are relatively benign in the environment. Other advantages of the present invention will be apparent to those skilled in the art based upon the detailed description of preferred and/or exemplary embodiments set forth below.

BRIEF DESCRIPTION OF THE DRAWINGS

To assist those of ordinary skill to which the subject matter of the present disclosure appertains in making and using heat-producing agglomerates and/or systems utilizing such heat-producing agglomerates, reference is made to the appended figures, wherein.

DETAILED DESCRIPTION OF INVENTION AND PREFERRED EMBODIMENTS

Figure 1:
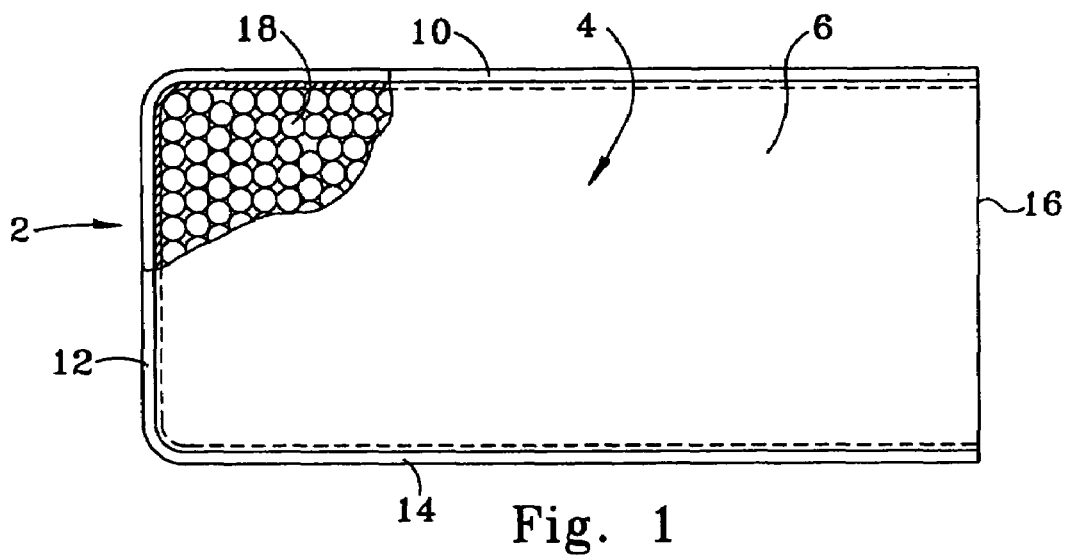
FIG. 1 shows a partially cut away top view of one embodiment of a flameless heater according to the present invention.

As used herein, "agglomerate" means a cohesive mass of solid particulate material. Suitable agglomerates may be any convenient form, such as, for example, tablets, briquettes, tiles, pellets, beads, spheres, or granules. As used herein, "tablet" means a shaped mass of agglomerated particulate material that is similar in appearance to a pill oral dosage form typically used for medications, "briquette" and "tile" each refer to generally rectilinear masses of agglomerated particulate material which resemble, respectively, a brick or a tile, "pellet" refers to an elongated cylindrical mass of agglomerated particulate material, and "beads", "spheres" and "granules" each refer to generally spherical masses of agglomerated particulate material.

As used herein, "acidic salt" means a salt which, when dissolved in water, exhibits a pH of less than 7. Suitable acidic salts include, for example, aluminum chloride, zinc chloride, titanium tetrachloride, ferrous chloride, and ferric nitrate.

As used herein, "acidic anhydride" means a substance that is derived from an acid by removal of one or more moles of water from the acid and/or that becomes an acid in the presence of water, and includes partially hydrated forms of such substances. Suitable acid anhydrides include, for example, phosphorus pentoxide, anhydrous aluminum chloride, partially hydrated acid anhydrides such as polyphosphoric acid, non-metal oxides such as $B_2O_3$ and BO, carboxylic acid anhydrides such as acetic anhydride, propionic anhydride, isobutyric anhydride, valeric anhydride, malonic anhydride, adipic anhydride, and phthalic anhydride.

As used herein, "base" means a substance which, when dissolved in water, exhibits a pH of greater than 7. Suitable bases include, for example, calcium hydroxide, potassium hydroxide.

As used herein, "basic salt" means a salt which, when dissolved in water, exhibits a pH of greater than 7. Suitable basic salts include, for example, sodium acetate, sodium benzoate, and potassium ascorbate.

As used herein, "basic anhydride" means a substance that is derived from a base by removal of one or more moles of water from the base and/or that becomes a base in the presence of water, and includes partially hydrated forms of such substances. Suitable basic anhydrides include, for example, calcium-oxide, metal oxides such as lithium oxide, sodium oxide, potassium oxide, rubidium oxide, cesium oxide, magnesium oxide, strontium oxide, and barium oxide.

The acidic component and/or the basic component of the heat-producing agglomerate preferably generate heat upon hydration, that is, upon contact with water. In those embodiments that comprise both an acidic component and a basic component, acidic and basic hydration products may further undergo an exothermic neutralization reaction and generate additional heat. The relative amounts of acidic component, basic component and any other components of the heat-producing agglomerate are generally selected to provide a desired heat output per unit mass of agglomerate. The relative amounts may also be selected to provide a residue, i.e., material remaining after use of the agglomerate, having desired properties, such as, for example, to provide a residue having a pH in a desired range.

The basic component of the agglomerate of the present invention may comprise calcium oxide, calcium hydroxide or a mixture thereof. In those embodiments of the invention wherein the basic component is a mixture of calcium oxide and calcium hydroxide, the basic component may comprise, based on 100 parts by weight (pbw) of the mixture, from about 35 pbw to about 99 pbw, and more typically from about from about 40 pbw to about 95 pbw, calcium oxide, and from about 1 pbw to about 65 pbw, and more typically from about 5 pbw to about 60 pbw, calcium hydroxide. The calcium oxide may be provided in the form of lime.

In some embodiments of the invention, the agglomerate comprises both an acidic component and a basic component. In these embodiments, based on 100 parts by weight of the combined weight of the acidic component and basic component of the agglomerate, the agglomerate may comprise from about 1 pbw to about 99 pbw, more typically from about 25 to about 85 pbw, even more typically from about 40 to about 75 pbw, and still more typically from about 50 to about 65 pbw, of the acidic component, and from about 1 pbw to about 99 pbw, more typically from about 15 to about 75 pbw, even more typically from about 25 to about 60 pbw, and still more typically from about 35 to about 50 pbw of the basic component.

The agglomerate of the present invention may comprise a mixture of particles of an acidic component selected from acid anhydrides, acid salts, and mixtures thereof and a basic component selected from bases, basic anhydrides, basic salts, and mixtures thereof. In a preferred embodiment, the acidic component comprises phosphorus pentoxide and the basic component comprises calcium oxide, calcium hydroxide or a mixture thereof. More preferably, the acidic component of the present invention is phosphorus pentoxide and the basic component of the present invention is calcium oxide.

The use of particulate acidic and basic components having certain selected particle size distributions can provide improved control over the reaction kinetics of the heat-producing agglomerate of the present invention, and thus the rate of heat generation exhibited by the agglomerate. For example, in a preferred embodiment of the present invention discussed in detail below, phosphorus pentoxide and calcium oxide are used as the acidic component and the basic component, respectively. When these components are used in the heat-producing agglomerate, it has been discovered that the particle size or particle size distribution of the components must be carefully controlled to avoid the possibility of an uncontrolled reaction that can produce large amounts of heat in a very short period of time. As discussed in detail below, by controlling the particle size and/or particle size distribution of the components of the heat-producing agglomerate, the reaction between the components can be controlled and potentially dangerous reactions can be avoided.

The distribution of particle sizes can be measured in several ways. For example, particle size distributions can be determined by sieve analysis by measuring the amount of material that will pass through a series of screens having different mesh sizes. Alternatively, particle size distribution may be determined using laser diffraction techniques.

The optimum particle sizes for each component of the heat-producing agglomerate is determined based upon the types of materials used, and can be readily determined by those of ordinary skill in the art based on the teachings herein. Typical particle sizes for particles of the acidic component of the composition of the present invention are described below as percent by volume ("vol %") of the total amount of such particles, as determined by laser diffraction. Typical particle sizes for particles of the basic component of the composition of the present invention are described below as percent by weight ("wt %") of the total amount of such particles, as determined by sieve analysis.

The particles of the acidic component of the heat-producing agglomerate may exhibit a particle size distribution wherein less than about 10 vol %, more typically less than about 5 vol %, of the particles have a particle size of greater than about 180 $\mu$m, and less than about 10 vol % of the particles have a particle size of less than about 15 $\mu$m. In those embodiments of the invention in which the acidic component of the present invention is phosphorus pentoxide, the phosphorus pentoxide will preferably have a particle size distribution wherein less than about 10 vol %, more typically less than about 5 vol %, of the particles have a particle size of greater than about 180 $\mu$m, from about 80 vol % to about 100 vol % of the particles have a particle size of between about 15 $\mu$m to about 180 $\mu$m, more typically between about 20 $\mu$m to about 140 $\mu$m, and even more typically between about 25 $\mu$m to about 100 $\mu$m, and less than about 10 vol % of the particles have a particle size of less than about 15 $\mu$m. In a preferred embodiment of the invention described below in which the acidic component is phosphorus pentoxide, 95% of the particles have a particle size between 30 $\mu$m and 75 $\mu$m.

The particles of the basic component may exhibit a particle size distribution wherein less than or equal to about 10 wt %, more typically about 5 wt %, of the particles have a particle size of greater than about 850 $\mu$m and less than or equal to about 50 wt %, more typically greater than or equal to about 40 wt %, of the particles have a particle size of greater than about 212 $\mu$m. In a preferred embodiment of the invention in which the basic component is calcium oxide, the calcium oxide has a particle size distribution wherein greater than or equal to about 50 wt % of the total mass of calcium oxide have a particle size of greater than about 200 $\mu$m.

The heat-producing agglomerate of the present invention may include other components, such as, for example, lubricants, flow aids, binders, disintegrants, solubilizers, and surfactants. In one embodiment, the heat-producing agglomerate of the present invention comprises, based on 100 pbw of the agglomerate, from about 80 to about 99 pbw, more typically from about 85 pbw to about 98 pbw, of the acid component, basic component, or mixture thereof, and from about 1 pbw to about 20 pbw, more typically from about 2 to about 15 pbw, of other components.

As used herein, "lubricant" means a substance that reduces friction between the composition of the present invention and the surfaces of an apparatus used to compact or otherwise process the composition into a compressed form. Suitable lubricants include, for example, stearic acid or mixtures of fatty acids, hydrogenated vegetable oils, triglycerides of fatty acids, metal stearates, such as for example, zinc stearate and magnesium stearate, or metal salts of fatty acid mixtures, sodium lauryl sulfate, polyethylene glycol and talc, as well as mixtures thereof. In one embodiment, the lubricant component of the composition of the present invention comprises magnesium stearate. If a lubricant is used, the amount of lubricant included in the heat-producing agglomerate, based on 100 pbw of agglomerate, is preferably from about 0.1 pbw to about 5 pbw, more typically from about 0.5 pbw to about 3 pbw, and still more typically from about 1 pbw to about 2 pbw, of the lubricant.

The heat producing agglomerate of the present invention may also contain a flow aid. A flow aid may be included in the agglomerate when it is desirable that the mixture of particulate components be and remain free-flowing until the mixture is compacted or otherwise processed to form an agglomerate. A free flowing mixture may be more easily transferred and more readily fills, for example, the mold cavities of a tablet press than would a mixture that is more prone to agglomeration or otherwise resistant to flow prior to molding. As used herein, "flow aid" means a substance that discourages agglomeration of the mixture of particulate components prior to compaction to thereby maintain the flowability of the mixture. Suitable flow aids include, for example, silica, talc, and tricalcium phosphate. In a preferred embodiment, the flow aid component of the composition of the present invention comprises a precipitated silica, a fused silica, or a mixture thereof. If a flow aid is used, the flow aid may generally comprise, based on 100 pbw of the agglomerate, from about 0.1 pbw to about 5 pbw, more typically from about 0.2 pbw to about 2 pbw, and still more typically from about 0.3 pbw to about 1 pbw, of the flow aid.

The heat-producing agglomerate of the present invention may further comprise other components, such as, for example, binders, disintegrants, solubilizers and surfactants. As used herein, "binder" means any substance that is capable of rendering the particulates of the mixture of the acidic component and the basic component compactable into a solid, coherent mass. Suitable binder compounds include, for example, waxes, polyvinylpyrrolidones, and hydroxyalkyl cellulose derivatives such as hyrdroxypropyl methylcellulose, hydroxypropyl cellulose and hydroxyethyl cellulose, as well as mixtures of the above. It may be desirable for some applications to use a hydrophobic binder that also serves to introduce hydrophobic domains into the agglomerate structure. Suitable hydrophobic binders include waxes such as, for example, paraffin, carnauba wax, and microcrystalline waxes. In a preferred embodiment, the binder component comprises carnauba wax. If a binder is included in the heat-producing agglomerate, the binder may generally comprise, based on 100 pbw of the agglomerate, from about 0.5 pbw to about 10 pbw, and more typically from about 3 pbw to about 7 pbw, of the binder.

Disintegrants serve to accelerate the disintegration and dissolution in an aqueous medium of compressed forms of the composition of the present invention. As used herein, "disintegrant" means a substance that is substantially insoluble in water, but that is capable of swelling in water. Suitable disintegrants include, for example, sodium carboxylmethyl starch, microcrystalline cellulose, soy protein, alginic acid, cross linked polyvinylpyrrolidone, also known as cross linked povidone, and cross linked sodium carboxymethylcellulose, also known as croscarmellose sodium, as well as mixtures thereof. In a preferred embodiment, the disintegrant that may be advantageously incorporated into the composition of the present invention comprises croscarmellose sodium. If a disintegrant is included in the heat-producing agglomerate, the disintegrant generally comprises, based on 100 pbw of the agglomerate, from about 1 pbw to about 8 pbw, and more typically from about 2 pbw to about 5 pbw, of the disintegrant.

As used herein, "solubilizer" means a water soluble component that increases the rate at which a compressed form of the composition of the present invention dissolves in water. Suitable solubilizers include, for example, polysaccharides such as maltodextrin, sorbitol, and lactose. In those embodiments of the invention in which a solubilizer is included in the heat-producing agglomerate, the solubilizer generally comprises, based on 100 pbw of the agglomerate, from about 1 pbw to about 5 pbw of solubilizer.

The heat-producing agglomerate may further comprise a surfactant. Suitable surfactants include nonionic surfactants, such as polyalkoxylated alcohols, cationic surfactants, such as imidazolines, dialkyl quaternary compounds, alkoxylated fatty amines, aliphatic, aromatic fatty amines, aliphatic fatty amides, and quarternary ammonium derivatives, anionic surfactants such as salts of alkyl benzene sulfonates, alkyl sulfates, alkyl ether sulfates, alkaryl ether sulfates, dialkyl sulfosuccinates, polyalkoxylated alcohol sulfates, and ether phosphates, and amphoteric surfactants such as alkali salts of amphocarboxyglycinates and amphocarboxypropionates, alkyl amphodipropionates, alkyl amphodiacetates, and alkyl amphopropyl sulfontates. In those embodiments of the invention in which a surfactant is included, the surfactant generally comprises, based on 100 pbw of the agglomerate, from about 0.5 pbw to about 5 pbw of the surfactant.

The heat-producing agglomerate may be shaped or formed as desired for ease of use or for a particular application. For example, in one embodiment, the agglomerate of the present invention is provided in the form of a particulate agglomerate having a mass of greater than 0.05 grams ("g") per agglomerate particle, more typically from about 0.05 g to about 2 g per agglomerate particle, even more typically from about 0.1 g to about 1 g per agglomerate particle, and still more typically from about 0.3 g to about 0.6 g per agglomerate particle. Alternatively, the heat-producing agglomerate may be provided in the form of a tablet. The tablet may be in roughly the shape of a right circular cylinder having a diameter of from about 0.1 inch to about 1 inch, more typically from about 0.25 inch to about 0.6 inch, and a height of from about 0.01 inch to about 0.5 inch, more typically from about 0.0625 inch to about 0.25 inch. The invention is not limited in this regard, and one skilled in the art will recognize that the heat-producing agglomerate may be formed into any desired shape, including briquettes, tiles, pellets, beads, spheres or granules.

Moreover, it is contemplated that adjustments and/or modifications to the overall shape and/or form of heat-producing agglomerates may be undertaken prior to heat generation, e.g., through exposure to water. Thus, for example, heat-producing agglomerates that have been formed into tablets, briquettes, tiles, pellets, beads, spheres or granules may be "broken up" (in whole or in part) prior to use, thereby increasing the surface area available for hydration and/or reaction. In breaking up such heat-producing elements, it is desired that the particle size distribution of the underlying components (e.g., acidic and basic components) be substantially non-affected through such pre-heat generation treatment or processing according to exemplary embodiments of the present disclosure.

When the heat-producing agglomerate is formed into a particular shape, it may be desirable in some applications for the formed agglomerate to exhibit certain physical characteristics. Two physical parameters that may be important for some applications are the crush strength and the friability of the formed agglomerate. Crush strength, as referred to herein, is measured according to ASTM D4179-88a, wherein the force required to crush agglomerates between two steel anvils is measured. In some embodiments, the formed heat-producing composition of the present invention exhibits an axial crush strength of greater than or equal to 0.5 kilopond ("kp"), more typically, from about 1 to about 10 kp, even more typically from about 2 to about 8 kp. In further embodiments of the present disclosure, the axial crush strength of the heat-producing composition may be greater, e.g., as high as about 35 kp.

The processing undertaken in fabricating heat-producing agglomerates according to the present disclosure may be guided, at least in part, by a desired axial crush strength. The axial crush strength generally correlates with the rate of heat generation of the disclosed heat-producing compositions. As a general matter, the greater the axial crush strength of the heat-producing composition, the slower the rate of heat generation (with all other variables constant). In addition, at the lower end of the axial crush strength range, issues of friability may arise. Thus, at lower axial crush strength values, it may be desirable and/or necessary to limit downstream processing and/or transportation of the heat-producing composition in a non-packaged or non-stabilized environment. For example, if the heat-producing composition is packaged immediately after processing, a crush strength value at the lower end of the disclosed range may pose a negligible friability issue.

Friability, as referred to herein, is measured according to US Pharmacopia 1216 Tablet Friability test (USP 25) and expressed as an attrition rate. In some embodiments, the formed heat-producing agglomerates of the present invention exhibit an attrition rate of less than 8%, more typically less than about 4%. Even more typically, the agglomerate of the present invention is substantially non-friable and exhibits an attrition rate of less than 3%.

The heat-producing agglomerates of the present invention may be produced using any agglomeration technique known to those skilled in the art, including agitation agglomeration techniques, such as for example fluidized bed drying and high shear mixing, pressure agglomeration techniques, such as for example compression, spray agglomeration techniques, such as for example spray drying, and thermal agglomeration techniques, such as for example sintering.

In a preferred embodiment, the heat-producing agglomerate is formed into the desired shape by compressing particulates of the components of the agglomerate into the desired shape. Depending upon the acidic component(s) and basic component(s) used, particulates of the acidic component and basic component, or mixtures thereof, may be directly compressed, without addition of other components, into the desired form or shape. Alternatively, components such as binders, flow aids, lubricants or other materials may be added prior to and/or during compression of the material into the desired shape.

As used herein, the term "directly compressed" is a reference to the "direct compression" method used in the pharmaceutical industry to make tablets. In the direct compression method, all the required tableting ingredients are incorporated into a free-flowing composition. A directly compressible composition requires no pre-processing or blending with additional aids in order to be tableted. Rather, the free-flowing particulate composition can be charged directly to the mold cavities of a tableting press. The components of the directly compressible heat-producing agglomerate are combined in particulate form and mixed to form a directly compressible mixture of particles to be charged to an apparatus for compressing the mixture to form agglomerates.

In one embodiment, a directly compressible particulate heat-producing composition comprises:

from about 40 to about 60 pbw of an acidic component,
from about 30 to about 50 pbw of a basic component,
from about 0.5 to about 10 pbw of an binder,
from about 0.1 to about 5 pbw of lubricant, and
from about 0.1 to about 5 pbw of a fluidizing agent.

The heat-producing agglomerate may be formed into the desired shape, such as for example, a tablet, by compressing a particulate heat-producing composition at a compressive force of from about 0.1 ton to about 1.5 tons, more typically from about 0.5 ton to about 1.0 ton. In another embodiment, the compressive force is applied in a two-roll mill to produce sticks or sheets of compressed heat-producing composition that are then briquetted or granulated to produce agglomerates of a desired size.

The heat-producing agglomerate of the present invention is used to generate heat by exposing the agglomerate to water. The heat-producing agglomerate must be exposed at least to sufficient water to allow sufficient hydration of the acidic and basic components to generate a desired level of heat. Additional water may be provided where it is desired to produce hot water, or to produce steam that may be used to heat a second material, such as a food stuff. The amount of water required is dependent upon the acidic and basic components used, as well as the amount of heated water or steam that may be desired. Typically, the heat-producing agglomerate of the present invention is exposed to at least about 30 grams (g) water per 100 grams of agglomerate, and more typically from between about 60 g to about 100 g water per 100 grams of agglomerate.

In one embodiment, the heat-producing agglomerate of the present invention exhibits a total heat output, as measured in a closed adiabatic calorimeter of greater than 120 kiloJoules (kJ) per 100 grams of agglomerate, more typically from about 140 to about 240 kJ per 100 grams of agglomerate, and even more typically from about 160 to about 200 kJ per 100 grams of agglomerate. In one embodiment, the heat-producing agglomerate of the present invention exhibits a rate of heat output, as determined by measuring heat output as a function of reaction time, of greater than about 15 to about 15,000 Watts ("W") per 100 grams of agglomerate, more typically from about 200 to about 4000 W per 100 grams of agglomerate, and a cumulative heat output of greater than about 120 kJ per 100 grams of agglomerate, more typically greater than about 140 kJ per 100 grams of agglomerate, is generated within about 5 minutes of exposure of the agglomerate to water.

In a preferred embodiment of the present invention, the heat-producing agglomerate is comprised of phosphorus pentoxide and calcium oxide, with the particle sizes of the two components controlled within specified ranges. It has been discovered that, if the particle sizes of the components are too small, a heat-producing agglomerate containing phosphorus pentoxide and calcium oxide can undergo a rapid, uncontrolled reaction in the presence of small amounts of water. The uncontrolled reaction can produce very large amounts of heat in a very short period of time, which is undesirable and can be dangerous. The potential that a rapid, uncontrolled reaction may be initiated when water is brought into contact with a heat-producing composition that includes acidic and basic components extends beyond the exemplary system of phosphorus pentoxide and calcium hydroxide. Indeed, the potential for a rapid, uncontrolled reaction encompasses the full range of potential acidic/basic components that may be used in forming a heat-producing agglomerate according to the present disclosure.

For example, one source of calcium oxide for heat-producing agglomerates is rotary kiln pulverized (RKP) lime. RKP lime is typically provided as a fine powder, with almost all of the calcium oxide having a particle size of 106 μm or less. Phosphorus pentoxide is typically provided as particles with 95% of the particles having a particle size between 45 μm and 75 μm. When these two materials are mixed in any ratio ranging from 25% RKP lime up to 75% RKP lime, with the remainder being phosphorus pentoxide, addition of a minimal amount of water can initiate an uncontrolled reaction. In extreme cases, moisture contained in air may be sufficient to cause the uncontrolled reaction to be initiated.

The uncontrolled reaction can be avoided if the content of $P_2O_5$ in the agglomerate is maintained less than 20% compared to the calcium oxide. However, this results in lower heat output for the agglomerate, and any problems that may occur in mixing the components can create local areas of higher $P_2O_5$ content where the uncontrolled reaction might occur.

The present inventors discovered that the uncontrolled reaction between $P_2O_5$ and CaO can be prevented by increasing the particle size of the CaO component. The larger particle size of the CaO blocks the propagation pathways of the uncontrolled reaction. In order to prevent the uncontrolled reaction between the $P_2O_5$ and CaO, at least about 50% of the CaO, and preferably at least about 60% of the CaO, should have a particle size of 200 µm or greater. In a preferred embodiment, the CaO has a particle size distribution as shown in the Table below:

| Calcium Oxide Particle Size | |
|---|---|
| US Mesh | % Retained |
| 16 | 30.6 |
| 20 | 25.1 |
| 30 | 18.2 |
| 40 | 11.2 |
| 70 | 10.8 |
| 100 | 0.3 |
| 200 | 2.7 |
| Pan | 1.1 |
| Total | 100.0 |

Using CaO with the particle size distribution shown above, a heat-producing agglomerate can be produced which does not undergo an uncontrolled reaction in the presence of small amounts of water. This allows the $P_2O_5$ and CaO to be present in the heat-producing agglomerate in relative amounts which produce high heat output per gram of material and reaction products with a pH in a range that is acceptable. In preferred embodiments, the heat-producing agglomerates contain between about 40% by weight and 65% by weight phosphorus pentoxide and between about 35 parts by weight and 55 parts by weight calcium oxide. In a further preferred embodiment of the present disclosure, the heat-producing agglomerate contains between about 45% by weight and 55% by weight phosphorus pentoxide and between about 40% by weight and 50% by weight calcium oxide.

As discussed above, the relationship of the particle size distribution of the acidic component(s) to the particle size distribution of the basic component(s) of the heat-producing compositions of the present disclosure is significant in ensuring that heat generation is effected in a controlled manner. According to the present disclosure, the particle size relationship may be expressed as a ratio. Thus, according to exemplary embodiments of the present disclosure, the particle sizes of at least 50% of the basic component (e.g., calcium oxide) is between about 2 and 10 times the particle size of 95% of the acidic component (e.g., phosphorus pentoxide) in the heat-producing composition. For purposes of the present disclosure, the foregoing relationship is referred to as the "Particle Size Ratio of Base to Acid." In preferred embodiments of the present invention, the Particle Size Ratio of Base to Acid is between about 2.0 and 5.0, and in particularly preferred embodiments of the present disclosure, the Particle Size Ratio of Base to Acid is between about 2.5 and 4.0.

The heat-producing agglomerate may also include a binder material to bind the particles to form the agglomerate. Any appropriate binder material known to those skilled in the art may be used. In a preferred embodiment, carnauba wax is used as a binder material. The heat-producing agglomerate may include between about 3% by weight and about 15% by weight carnauba wax.

A releasing agent may also be included in the heat-producing agglomerate to aid in the agglomeration process. Any appropriate releasing agent known to those skilled in the art may be included in the agglomerate. In a preferred embodiment, magnesium stearate is used as the releasing agent. The heat-producing agglomerate may contain up to about 2% by weight of the releasing agent.

In a preferred embodiment, the heat-producing agglomerate comprises about 53.25% by weight phosphorus pentoxide, about 41.25% by weight calcium oxide, about 4.5% by weight carnauba wax and about 1% by weight magnesium stearate.

As described herein, the heat-producing agglomerate may be provided in several forms, such as a tablet, a tile, a briquette, etc. In a preferred embodiment, the heat-producing agglomerate is provided in the form of a tablet. A tablet press may be used to press the agglomerate into a tablet of any desired size or shape. For example, tablets of the agglomerate may be formed using a Stokes 551 table press with a $13/32$ inch die. Tablet strength is generally within a range of about 2-35 Kilobond, preferably between about 6-14 Kilopond, and more preferably within a range of about 9-10 Kilopond.

Containers suitable for use as container component of the flameless heater and self-heating packaging system of the present invention may be constructed of any material that is substantially impervious to water, i.e., liquid water and water vapor, that does not react with the components of the heat-producing agglomerate under the conditions of use, and that has sufficient heat resistance to maintain its integrity under the conditions of use.

Material vessels suitable for use as a material vessel of the self-heating packaging system of the present invention may be constructed of any material that is compatible with the material to be contained in the vessel and that has sufficient heat resistance to maintain its integrity under the conditions of use. In those embodiments where the material vessel is to come into contact with the heat producing agglomerates, the material vessel should be constructed of a material that is substantially impervious to water/water vapor, and does not react with the components of the heat-producing agglomerate under the conditions of use.

Materials suitable for use in construction of the container and the material vessel include, for example, metals, organic polymers, such as polyethylenes, polysulfones, and polyimides, in the form of, for example, shaped articles, polymer films, metal foils, or metallized polymer films.

Figure 2:
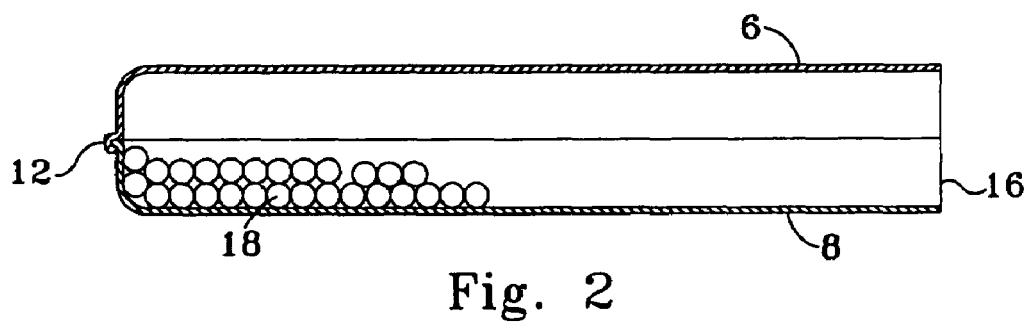
FIG. 2 shows a cross-sectional side elevation view of the heater of FIG. 1.

An embodiment of the flameless heater of the present invention is shown in FIGS. 1 and 2. Flameless heater (2) comprises a flexible envelope (4) consisting of two sheets (6), (8) that are fused along three edges (10), (12), (14) and open along one edge (16) and heat-producing agglomerates (18) disposed inside envelope (4). The sheets (6), (8) comprise, for example, polymer film, metal foil or metallized polymer film. Water and/or water vapor, typically in a selected, measured amount, is then introduced to the envelope (4) to activate the heater (2).

In one embodiment, the heat-producing agglomerates are packaged in envelope (4) and edge (16) is sealed to provide closed, moisture resistant container for the heat-producing agglomerates, in order to activate the flameless heater (2), the envelope is opened, e.g., along edge (16), and then water/water vapor is introduced to the envelope (4).

In another embodiment, heat-producing agglomerates are packaged in a moisture-resistant container other than envelope (4). Suitable moisture-resistant containers include, for example, sealed metal foil or polymer packets. In order to activate the flameless heater (2), the moisture-resistant container is opened, the heat-producing agglomerates are introduced into the flexible envelope (4), and then water/water vapor is introduced into the flexible envelope (4).

Figure 3:
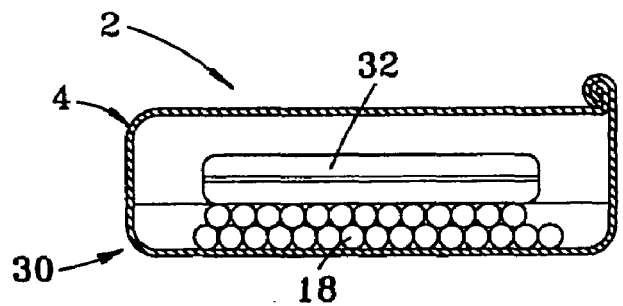
FIG. 3 shows a partially cut away top view of one embodiment of a self-heating packaging system that includes the heater of FIGS. 1 and 2.

An exemplary embodiment of the self-heating package of the present invention is shown in FIG. 3. The self-heating package (30) consists of a material vessel (32) and flameless heater (2). The material vessel (32) consists of a sealed, generally rectangular envelope that is constructed of, for example, polymer film, metal foil or metallized polymer film, and that contains food material. Water/water vapor is introduced to the envelope (4) to activate the heater (2). The material vessel (32) is placed inside (or alternatively, in contact with) envelope (4) and the energy generated by heater (2) is used to heat the material vessel (32) and its contents.

Figure 4:
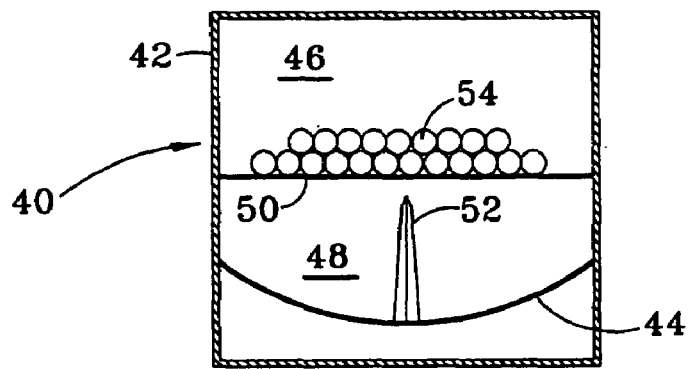
FIG. 4 shows a cross sectional side elevation view of another embodiment of a self-heating packaging system.

Another exemplary embodiment of the flameless heater of the present invention is shown in FIG. 4. A flameless heater (40) includes a generally cylindrical container (42) having a flexible wall (44) and encloses a first compartment (46) and a second compartment (48), wherein the compartments (46, 48) are separated by a membrane (50). A plunger (52) is mounted on the inside of the flexible wall (44). Heat producing agglomerates (54) are disposed in compartment (46) and water is disposed in compartment (48). The heater (40) is activated by pressing against flexible wall (44) to displace plunger (52) and puncture membrane (50) to allow the water to mix with the heat-producing agglomerates (54).

In one embodiment, the residue generated by use of the heat-producing agglomerate of the present invention exhibits a pH of from about 2 to about 12, more typically from about 3 to about 9, even more typically from about 3.5 to about 5.5.

EXAMPLE I

In this Example, an embodiment of the heat-producing agglomerate in the form of tablets was made and tested as follows.

The heat-producing agglomerate in this Example was comprised of the following ingredients (100 pbw mixture): (1) 54 pbw phosphorus pentoxide ($P_2O_5$), (2) 38 pbw calcium oxide (CaO), (3) 4.5 pbw carnauba wax as a binder, (4) 1 pbw magnesium stearate as a lubricant, (5) 0.5 pbw silica, (TIXOSIL 43) as a flow aid, and (6) 2.0 pbw croscarmellose sodium (Ac-di-sol) as a disintegrant. The ingredients were combined and mixed in a Porta-shell double cone mixer for 8 minutes to provide a free-flowing mixture of particles.

The $P_2O_5$ had a particle size distribution, determined by laser diffraction using a LS 130 Particle Size Analyzer (Coulter), that exhibited a mean of 56.84 µm, a median of 61.30 µm and a mode of 88.29 µm and wherein 90% of the particles had a particle size of less than 91.40 µm, 75% of the particles had a particle size of less than 52.47 µm, 50% of the particles had a particle size of less than 61.30 µm, 25% of the particles had a particle size of less than 31.86 µm, and 10% of the particles had a particle size of less than 15.43 µm.

The CaO was rotary kiln pulverized CaO having a particle size distribution as follows, which sets forth the percent by weight of CaO retained on each of a series of screens of differing mesh sizes:

| US Mesh size/micrometers (µm) | wt % Retained |
| --- | --- |
| 120/125 | 0 |
| 140/106 | 54.4 |
| 170/90 | 9.6 |
| 200/75 | 8.2 |
| 230/63 | 9.1 |
| 325/45 | 14.6 |
| Pan | 4.1 |

The mixture was compressed to form tablets (13/32 inch diameter, about 0.3 grams per tablet) using a Stokes tablet press. The tablets exhibited a crush strength of 4.75 kp, measured according to ASTM D4179 using a Schleuniger 2E Hardness tester. The tablets exhibited a friability of 3%. Friability was measured according to the method described in §1216 of US Pharmacopia 25 by tumbling 20 tablets in a Vanderkamp Model 10805 Friability tester for 4 minutes. The tablets were weighed before and after tumbling and friability is expressed as % friability, wherein: % friability= (1−(tablet weight after tumbling/tablet weight before tumbling)).

The heat output of the tablets was measured. Tablets (30.6 grams) were placed in a closed adiabatic vessel equipped to record temperature and pressure. Water (18.2 grams) was introduced in the vessel. A maximum temperature of 301° C. and a maximum pressure of 1232 pounds per square inch, absolute ("psia") were recorded. The total heat output of the tablets was determined to be 51.5 kJ (1.68 kJ per gram of tablet) by heat balance calculation. The tablet residue exhibited a pH of 3.5.

The tablets were tested in a self-heating package of the type shown in FIG. 3. A sealed rectangular trilaminate pouch 205 mm long×120 mm wide×12 mm high containing 8 ounces of food (beef stew) was equipped with two thermocouples, centered according to the width and height of the food and at opposite ends lengthwise. The container of food and agglomerates (45 grams) were placed in a trilaminate and polypropylene envelope 480 mm long by 155 mm wide. Water (27 grams) was then introduced into the envelope. The temperature within the food container was measured with the thermocouples and recorded with a data logger every second for 14 minutes following the introduction of the water to the envelope. The results are summarized in TABLE I below. At the 12 minute mark, the average temperature of the food was found to have been elevated by 67° C. (121° F.).

TABLE I

| Time (seconds) | Thermocouple 1-Temp (° C.) | Thermocouple 2-Temp (° C.) |
| --- | --- | --- |
| 0 | 4.6 | 4.9 |
| 30 | 5.2 | 6.4. |
| 60 | 9.8 | 9.9 |
| 90 | 16.1 | 19.2 |
| 120 | 64.9 | 41.8 |
| 150 | 75.2 | 50.4 |
| 180 | 79 | 53.5 |
| 210 | 81.4 | 58.6 |
| 240 | 83.2 | 61.2 |
| 270 | 84.2 | 63.6 |
| 300 | 84.3 | 65.4 |
| 330 | 84.1 | 66.8 |
| 360 | 83.6 | 67.9 |
| 390 | 82.8 | 65.7 |
| 420 | 81.9 | 69.2 |

TABLE I-continued

| Time (seconds) | Thermocouple 1-Temp (° C.) | Thermocouple 2-Temp (° C.) |
|---|---|---|
| 450 | 80.8 | 69.7 |
| 480 | 79.9 | 70 |
| 510 | 78.9 | 70.3 |
| 540 | 78.1 | 70.7 |
| 570 | 77.1 | 71 |
| 600 | 76.2 | 71.2 |
| 630 | 75.3 | 71.2 |
| 660 | 74.5 | 71.2 |
| 690 | 73.6 | 71 |
| 720 | 72.8 | 70.8 |

EXAMPLE 2

The heat-producing tablets of Example 2 were analogous to those of Example 1, except that the CaO exhibited a particle size distribution, expressed as the percent of the CaO retained on a series of classifying screens of different mesh sizes, as follows:

| US Mesh size/micrometers (μm) | wt % Retained |
|---|---|
| 16/1180 | 2.7 |
| 20/850 | 14.3 |
| 30/600 | 16.2 |
| 40/425 | 13.8 |
| 70/212 | 18.9 |
| 100/150 | 6.9 |
| 200/75 | 8.8 |
| Pan | 18.4 |

The heat-producing agglomerate in this Example was comprised of the following ingredients (based on 100 pbw mixture): (1) 53 pbw phosphorus pentoxide ($P_2O_5$), (2) 41 pbw calcium oxide (CaO), (3) 4.5 pbw carnauba wax as a binder, (4) 1 pbw magnesium stearate as a lubricant, (5) 0.5 pbw silica, (TIXOSIL 43) as a flow aid, and (6) 2.0 pbw crosscarmellose sodium (Ac-di-sol) as a disintegrant. The ingredients were combined, mixed and compressed into tablets by the same method described in Example 1 above. The tablets exhibited a crush strength of 4.8 kp, measured as described above in Example 1, and a friability of 3%, measured as described above in Example 1.

The heat output of the tablets was measured. Tablets (31.35 grams) were placed in a closed adiabatic vessel equipped to record temperature and pressure. Water (22.3 grams) was introduced in the vessel. A maximum temperature of 281° C. and a maximum pressure of 915 psia were recorded. The total heat output of the tablets was determined to be 50.5 kJ (1.61 kJ per gram of tablet) by heat balance calculation. The tablet residue exhibited a pH of 3.

The tablets were tested in a self-heating package of the type shown in FIG. 3. A sealed rectangular trilaminate pouch 205 mm long×120 mm wide×12 mm high containing 9 ounces of water was equipped with one thermocouple, centered in the food. The container of food and heat-producing tablets (55 grams) were placed in a trilaminate and polypropylene envelope 480 mm long by 155 mm wide. Water (44 grams) was then introduced into the envelope. The temperature within the water container was measured with the thermocouple and recorded with a data logger every second for 12 minutes following the introduction of the water to the envelope. The results are summarized in TABLE 2 below. At the 6 minute mark, the temperature of the water was found to have been elevated by 55° C. (99° F.). At the 9 minute mark, the temperature of the water was found to have been elevated by 56° C. (101° F.).

TABLE 2

| Time (sec) | Temperature (° C.) |
|---|---|
| 0 | 4.8 |
| 30 | 4.7 |
| 60 | 9.4 |
| 90 | 31 |
| 120 | 42 |
| 150 | 48.1 |
| 180 | 52.6 |
| 210 | 54.2 |
| 240 | 56.3 |
| 270 | 57.4 |
| 300 | 58.6 |
| 330 | 59.7 |
| 360 | 59.7 |
| 390 | 59.5 |
| 420 | 59.7 |
| 450 | 60.3 |
| 480 | 60.4 |
| 510 | 60.5 |
| 540 | 60.6 |
| 570 | 60.5 |
| 600 | 60.5 |
| 630 | 60.3 |
| 660 | 60.1 |
| 690 | 60.1 |
| 720 | 60 |

As will be recognized by those of ordinary skill in the art based on the teachings herein, numerous changes and modifications may be made to the above-described invention without departing from its scope as defined in the appended claims. Accordingly, this detailed description of preferred embodiments is to be taken in an illustrative, as opposed to a limiting, sense.

The invention claimed is:

1. A heat-producing agglomerate comprising:
   (a) phosphorus pentoxide;
   (b) calcium oxide; and
   (c) a wax binder material; wherein the particle sizes of at least 50% of the calcium oxide are between about 2 and 10 times the particle sizes of 95% of the phosphorus pentoxide; wherein at least 95% of the phosphorus pentoxide has a particle size of between 30 μm and 75 μm, and at least 50% of the calcium oxide has a particle size greater than 200 μm.

2. The heat-producing agglomerate of claim 1, wherein the wax binder material is carnauba wax.

3. The heat-producing agglomerate of claim 2, further comprising magnesium stearate.

4. The heat-producing agglomerate of claim 2, wherein the agglomerate comprises between about 1 part by weight and about 99 parts by weight of phosphorus pentoxide, between about 1 part by weight and about 99 parts by weight of calcium oxide, and between about 0.5 parts by weight and 10 parts by weight of a binder.

5. The heat-producing agglomerate of claim 1, wherein the agglomerate further comprises between about 0.1 parts by weight and about 5 parts by weight of a lubricant selected from the group consisting of stearic acid, hydrogenated vegetable oils, zinc stearate, magnesium stearate, sodium lauryl sulfate, polyethylene glycol, talc, and mixtures thereof.

6. The heat-producing agglomerate composition of claim 1 comprising between about 40 parts by weight and 65 parts by weight phosphorus pentoxide, between about 35 parts by weight and 55 parts by weight calcium oxide, and between about 3 parts by weight and 15 parts by weight carnauba wax.

7. The heat-producing agglomerate of claim 6, wherein at least 60% of the calcium oxide has a particle size greater than 200 μm.

8. The heat-producing agglomerate of claim 7, further comprising up to about 2 parts by weight magnesium stearate.

9. The heat-producing agglomerate of claim 8, wherein the agglomerate is pressed into the shape of a tablet.

10. The heat-producing agglomerate of claim 9, wherein the tablet has a crush strength of between about 2 kilopond and about 35 kilopond.

11. The heat-producing agglomerate of claim 10, wherein the tablet has a friability of less than about 3%.

12. The heat-producing agglomerate of claim 7, wherein the agglomerate is formed into bricks, tiles, pellets, beads, spheres, tablets or granules.

13. The heat-producing agglomerate of claim 8, wherein the agglomerate comprises about 53.25 parts by weight phosphorus pentoxide, about 41.25 parts by weight calcium oxide, about 1 part by weight magnesium stearate, and about 4.5 parts by weight carnauba wax.

14. A method for heating food or a liquid comprising the steps of:
  (a) placing the food or liquid to be heated in a container in proximity to a heat-producing agglomerate composition which comprises phosphorus pentoxide, calcium oxide, and carnauba wax; wherein the particle sizes of at least 50% of the calcium oxide are between about 2 and 10 times the particle sizes of 95% of the phosphorus pentoxide; wherein at least 95% of the phosphorus pentoxide has a particle size of between 30 μm and 75 μm, and at least 50% of the calcium oxide has a particle size greater than 200 μm; and
  (b) contacting the heat-producing agglomerate composition with water to generate heat to thereby heat the food or liquid.

15. The method of claim 14, wherein the heat-producing agglomerate composition comprises between about 40 parts by weight and 65 parts by weight phosphorus pentoxide, between about 35 parts by weight and 55 parts by weight calcium oxide, and between about 3 parts by weight and 15 parts by weight carnauba wax.

16. A flameless heater comprising a heat-producing agglomerate composition and a container for the heat-producing agglomerate composition, wherein the composition comprises: between about 40 parts by weight and 65 parts by weight phosphorus pentoxide, between about 35 parts by weight and 55 parts by weight calcium oxide, and between about 3 parts by weight and 15 parts by weight carnauba wax; wherein at least about 95% of the phosphorus pentoxide has a particle size of between 30 μm and 75 μm; wherein at least 60% of the calcium oxide has a particle size greater than 200 μm; and further comprising up to about 2 parts by weight magnesium stearate; and wherein the particle sizes of at least 50% of the calcium oxide are between about 2 and 10 times the particle sizes of 95% of the phosphorus pentoxide.

17. The flameless heater of claim 16, wherein the container is a flexible envelope comprised of a polymer film, metal foil or metallized polymer film.

18. A self-heating package for heating a food or liquid comprising:
  (a) a material vessel that contains a food or liquid to be heated; and
  (b) a flameless heater comprising a heat-producing agglomerate composition and a container for the heat-producing agglomerate composition; wherein the composition comprises: between about 40 parts by weight and 65 parts by weight phosphorus pentoxide, between about 35 parts by weight and 55 parts by weight calcium oxide, and between about 3 parts by weight and 15 parts by weight carnauba wax further comprising up to about 2 parts by weight magnesium stearate; and wherein the particle sizes of at least 50% of the calcium oxide are between about 2 and 10 times the particle sizes of 95% of the phosphorus pentoxide; wherein at least about 95% of the phosphorus pentoxide has a particle size of between 30 μm and 75 μm.

19. The self-heating package of claim 18, wherein the material vessel is comprised of a material selected from the group consisting of a metal, a polymer film, a metal foil or a metallized polymer film.

20. The self-heating package of claim 19, wherein the container is comprised of a material selected from the group consisting of a polymer film, metal foil or metallized polymer film.

21. The heat-producing agglomerate of claim 1 wherein the particle sizes of at least 50% of the calcium oxide are between about 2 and 5 times the particle sizes of 95% of the phosphorus pentoxide.

22. The heat-producing agglomerate of claim 1 wherein the particle sizes of at least 50% of the calcium oxide are between about 2.5 and 4 times the particle sizes of 95% of the phosphorus pentoxide.

* * * * *